DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 10, 1972

903 O.G. 375

T903,034

SENSITIZING DYE COMBINATION CONTAINING SYMMETRICAL BENZIMIDAZOLOCARBOCYANINE DYES

Mary Jane W. Brizee, % Eastman Kodak Company, Rochester, N.Y. 14650

Filed Sept. 24, 1971, Ser. No. 183,650
Int. Cl. G03c *1/10, 1/14*
U.S. Cl. 96—124
No Drawing. 37 Pages Specification

Photographic silver halide emulsions are spectrally sensitized with a dye combination comprising (1) a symmetrical benzimidazolocarbocyanine dye and (2) a sensitizing dye selected from the group consisting of (a) a hemicyanine dye, (b) a merocyanine dye, (c) a complex cyanine dye containing a 5-membered ketomethylene heterocyclic nucleus containing nitrogen as the first heteroatom and nitrogen or sulfur as the second heteroatom, (d) a dicarbocyanine dye, (e) a tricarbocyanine dye and (f) a hemioxonol dye. In preferred dye combinations the symmetrical benzimidazolocarbocyanine dye has the following formula:

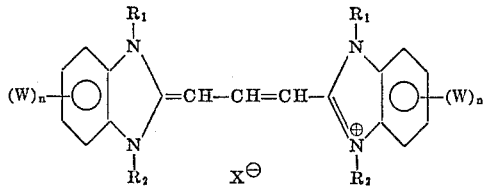

wherein each $n$ represents 1 or 2; each $R_1$ represents an unsubstituted lower alkyl group; each $R_2$ represents an alkyl group, an alkenyl group or an aryl group; X represents an acid anion and W represents halogen, an alkylcarbamoyl group, an acyl group, an aryl group, an alkyl group, an alkoxy group, cyano, a haloalkyl group or a haloalkylsulfonyl group. Typical highly useful emulsions comprise silver bromoiodide emulsions containing a combination of a symmetrical benzimidazolocarbocyanine dye such as an anhydro-5,5′,6,6′-tetrachloro-1,1′-diethyl-3,3′ - bis(sulfobutyl)-benzimidazolocarbocyanine hydroxide or 5,5′,6,6′-tetrachloro-1,1′-diethyl-3,3′-bis(2-piperidinoethyl)-benzimidazolocarbocyanine iodide and one of the dyes (a) through (f) above.